United States Patent

Lindman

[11] Patent Number: 6,155,210
[45] Date of Patent: Dec. 5, 2000

[54] PROCESS FOR OBTAINING FLUE GASES WITH LOW CONTENT OF $NO_x$ WHILE COMBUSTING BLACK LIQUOR AND A RECOVERY BOILER THEREFOR

[75] Inventor: Nils Gustav Lindman, Enskede, Sweden

[73] Assignee: Kvaerner Pulping AB, Sweden

[21] Appl. No.: 09/356,920

[22] Filed: Jul. 19, 1999

Related U.S. Application Data

[62] Division of application No. 09/091,046, Jun. 4, 1998.

[51] Int. Cl.⁷ .................................................. F22D 1/02
[52] U.S. Cl. ................................................ 122/7 R; 162/31
[58] Field of Search ........................ 122/7 R; 162/31, 162/30.1, 252; 110/147, 188, 314, 345; 423/242.1

[56] References Cited

U.S. PATENT DOCUMENTS

| | | | |
|---|---|---|---|
| 3,625,186 | 12/1971 | Herbst | 122/7 R |
| 4,462,319 | 7/1984 | Larsen | 122/7 R |
| 5,022,331 | 6/1991 | Simonen | 122/7 R |
| 5,478,440 | 12/1995 | Paju | 122/7 R |
| 5,771,817 | 6/1998 | Olausson et al. | 110/238 |
| 5,803,020 | 9/1998 | Palmgren | 122/7 R |

FOREIGN PATENT DOCUMENTS

| | | |
|---|---|---|
| 0252893 | 7/1987 | European Pat. Off. . |
| 0430144A1 | 11/1990 | European Pat. Off. . |
| WO92/16688 | 10/1992 | WIPO . |

*Primary Examiner*—Pamela Wilson
*Assistant Examiner*—Gregory A. Wilson
*Attorney, Agent, or Firm*—Fasth Law Offices; Rolf Fasth

[57] ABSTRACT

The invention relates to a method of firing black liquor in recovery boilers where the intention is to get fumes having a low content of nitrogen oxides ($NO_x$). The invention is characterized in that a part of the combustion air is added as a last portion at a level on a very high level so that a reducing atmosphere will exist in a very great part of the boiler and during a long period of time of at least 3–5 seconds. The invention also includes a recovery boiler for carrying out the above said method.

4 Claims, 3 Drawing Sheets

PROCESS FOR OBTAINING FLUE GASES WITH LOW CONTENT OF NO$_x$ WHILE COMBUSTING BLACK LIQUOR AND A RECOVERY BOILER THEREFOR

PRIOR APPLICATION

This is a divisional patent application of U.S. patent application Ser. No. 09/091,046, filed Jun. 4, 1998.

AREA OF THE INVENTION

The present invention relates to a process for combusting black liquor in recovery boilers. The invention also includes a recovery boiler for implementing the process according to the invention.

STATE OF THE ART AND PROBLEMS

Recovery boilers for combusting black liquor which is obtained during cellulose cooking have been well known for many decades. Their task is, on the one hand, to generate energy by means of the combustion and, on the other hand, to recover chemicals which were used during the cellulose cooking and which are released in the smelt state during the combustion and tapped off from the bottom part of the recovery boiler. Recovery boilers are large installations and, apart from generating a large quantity of energy and recovered chemicals, also generate a large quantity of flue gases. These flue gases contain, inter alia, nitrogen oxides which have arisen during the combustion of the liquor.

During recent years, ever stricter requirements have been introduced with regard to the discharge of nitrogen oxides into the atmosphere. It is well known that these oxides contribute to acidification and other unfavourable effects on the natural environment. Nevertheless, the quantity of nitrogen oxides which is emitted from the recovery boilers of the wood-processing industry is low as compared with that originating from cars, etc. While the contents are normally within the range of 40–70 mg of NO$_2$/MJ (calculated as the effective heat value in a reducing medium), even these low contents have to be decreased substantially in future. The discharges have been shown depend principally on the nitrogen content of the fuel, i.e. the black liquor, and this content will increase in the future as the chemical cycles are closed ever more stringently. This will result in the nitrogen oxide emissions increasing if countermeasures are not taken.

Factors which can effect the formation of nitrogen oxides are dwell time, temperature and oxygen content.

As a result of experience gained from conventional power boilers based on coal, oil and gas, it is known that substoichiometric conditions with regard to the oxygen supplied to the combustion zone, in combination with a final combustion, for the purpose is of obtaining maximum energy evolution, in a so-called overfire air register which is placed directly above (or after) the combustion zone, result in a lower No$_x$ emission.

This technique has also, for a long time now, been used for other reasons in recovery boilers, where primary air and secondary air have been supplied below (before) the black liquor, and tertiary air has been supplied immediately above (after), in a similar manner to that in which overfire air has been used for power boilers. This is described in more detail by Anderson & Jackson in the TAPPI Journal for January 1991, pp. 115–118.

SE 468 171 discloses a method for decreasing the content of nitrogen oxides in the flue gas, in which method a part of the combustion air is supplied, as a final portion, at a very high level so that a higher grade of reducing atmosphere is maintained, without any extra addition of reducing substances, over a distance of 10–20 metres or greater, from the region of the liquor injection and up to the point of the final addition of air, corresponding to a dwell time under normal loading of 2.5–5 seconds or more. This method presupposes that the recovery boiler is relatively tall so that the reducing atmosphere can be maintained for a sufficiently long time.

Another method has been proposed for reducing the NO$_x$ in the recovery boiler, which method uses the technique, which has been developed for power boilers, involving thermal or selective non-catalytic reduction (SNCR), by means of supplying a reducing substance, in the form of natural gas, ammonia or urea, relatively high up the recovery boiler for the purpose of reducing nitrogen oxides which have been formed. When natural gas is used, large quantities of uncombusted residual products are formed which have to be finally combusted by means of a further addition of air. When urea or ammonia is used, they are normally added, in the form of an aqueous solution, to the upper parts of the furnace space. A major disadvantage of using this method in a recovery boiler is that an aqueous solution is being supplied, involving the risk of causing water/smelt explosions. This can occur, for example, in association with faulty handling and if corrosion damage arises which is caused by the urea solution.

An alternative to introducing an aqueous solution of ammonia can be to introduce it after volatilization using spray guns. This procedure requires many spray guns and the handling of concentrated ammonia in the immediate vicinity of the boiler. In addition, there is the risk of obtaining very high concentrations of ammonia locally in the furnace, and consequently non-optimal conditions for NO$_x$ reduction.

SE 460 221 discloses a method of supplying ammoaia gas to an MBC (Multiple Bed Combustion) boiler, in which method the ammonia gas is supplied to secondary and/or tertiary air, which is mixed with flue gas and supplied to one or more upper fluidized beds for the purpose of fluidizing these beds. While this technique can function well in an MBC boiler, it does not do so in a recovery boiler since the temperature distribution is much better in an MBC boiler.
Solution and advantages:

However, the present invention has resulted in a process for obtaining, in association with the combustion of black liquor in recovery boilers, flue gases having a low content of nitrogen oxides, in which process a part of the combustion air is supplied, as a final portion, at a high level so that a reducing atmosphere is maintained, from the region of the liquor injection and up to the final addition of air, over a distance of 10–20 metres or more, corresponding to a mean dwell time under normal loading of 2.5–5 seconds or more. The method is characterized in that ammonia is supplied to the said final portion of combustion air in a quantity corresponding to 100–400% of the stoichiometric requirement for complete reduction of nitrogen oxides present in the flue gas. If the boiler is not equipped with a flue gas wash, the ammonia is preferably supplied in a quantity corresponding to 100–200%. If the boiler is equipped with a flue gas wash, the ammonia is preferably supplied in a quantity corresponding to 100–300%.

The ammonia is added to the combustion air either in conjunction with the latter being introduced, or even more preferably before the latter is introduced, into the furnace space. The ammonia is preferably added in gasified form, with the gasification taking place either by means of volatilization of pure, liquid ammonia or by means of evaporating ammonia from its aqueous solution.

It is simplest to add the ammonia directly to the combustion air either immediately upstream or immediately downstream of the air fan. Alternatively, ammonia gas can be supplied directly to the air ports (supply openings) by way of separate compressed air-driven feed lines.

The final portion of the combustion air, which portion contains ammonia according to the invention, can be supplied in two stages at two high levels.

The quantity of ammonia-containing combustion air which, according to the invention, is to be added at the high level(s) constitutes approximately 2.5–50%, preferably 5–15%, of the total combustion air.

The process according to the invention also includes the proportion of nitrogen oxides in the flue gases being monitored with the aid of a control system which automatically regulates the supply of air to the different levels and the supply of ammonia to the combustion air. The quantity of ammonia which is to be supplied, i.e. 100–400% of the stoichiometric requirement for complete reduction of nitrogen oxides present in the flue gas, preferably 100–200% for boilers without a flue gas wash and 100–300% for boilers with a flue gas wash, is determined by measuring the content of nitrogen oxide and ammonia in departing flue gases. The stoichiometric requirement which is meant in this patent application is set in the conventional manner at 1 mol of $NH_3$ per mole of $NO_x$. The quantity of ammonia which is added then becomes 1–4 mol per mole of nitrogen oxide, preferably 1–2 mol per mole for boilers without a flue gas wash and 1–3 mol per mole for boilers with a flue gas,wash.

The requisite quantity of ammonia can be obtained either by buying it or else generating it internally in the mill, for example by stripping condensates.

When the nitrogen oxides are reduced, it is assumed that nitrogen and water are formed in accordance with the following overall reaction:

$$NO+NH_3+OH \rightarrow N_2+2H_2O$$

The aim is that all the ammonia should be oxidized to nitrogen. Any possible discharge of ammonia in the flue gases is minimized by measuring and adjusting the quantity added. In the case of boilers which are equipped with a flue gas wash, a larger quantity of ammonia can be added without there having to be any increase in the discharge of ammonia. This is advantageous since a high level of ammonia addition results in a greater reduction of the nitrogen oxides.

The invention also includes a recovery boiler for combusting black liquor in accordance with the described method. The recovery boiler is characterized in that, in addition to conventional devices for supplying primary air, secondary air and tertiary air, and devices for supplying high tertiary air or quaternary air at a substantially higher level, in accordance with SE 468 171, it also includes devices for supplying ammonia to the said high tertiary air or quaternary air. In this context, high tertiary air is understood to mean air which has been branched off from the normal tertiary air line, while quaternary air is understood to mean air which comes from a separate line.

In the recovery boiler according to the invention, the devices for supplying ammonia-containing high tertiary air or quaternary air can be situated at one or more levels around 10–20 metres above the level at which the liquor is injected.

The recovery boiler according to the invention can be provided with two or more rows of supply openings, on either side of the furnace space, for supplying ammonia-containing high tertiary air or quaternary air, with it being possible for one level to be at approximately 10 metres and the other at approximately 16 metres above the level at which the liquor is injected.

According to the invention, it is expedient for the uppermost air supply openings, for the ammonia-containing air, to be located directly below, preferably 1–4 metres below, and even more preferably 2–3 metres below, the region where the boiler is narrowest, i.e. where the internal "nose" is arranged.

Finally the recovery boiler according to the invention is characterized in that it includes a control system for automatically controlling the different supply streams of the combustion air and also a control system for the ammonia supply.

Consequently, a major advantage of the invention is that, since the ammonia is supplied in gaseous form, there is no risk of water/smelt explosions.

A further advantage is that the ammonia is introduced into the boiler where it does the most good, i.e. when almost all the combustion reactions have finished and the temperature has fallen to approximately 950° C.

Yet another advantage is that only small quantities of concentrated ammonia have to be handled in the immediate vicinity of the boiler since this ammonia is rapidly diluted in the high tertiary air or quaternary air. In addition, the turbulence which the jets of high tertiary air or quaternary air create in the boiler distribute the ammonia very efficiently in the boiler, with optimum concentration conditions being created for reducing nitrogen oxides.

In that which follows, the invention will be described in more detail with reference to the attached drawing, which schematically shows a recovery boiler according to the invention in cross section, and a diagram which shows the effect which is achieved by the invention.

DETAILED DESCRIPTION OF THE INVENTION

Figure 1:
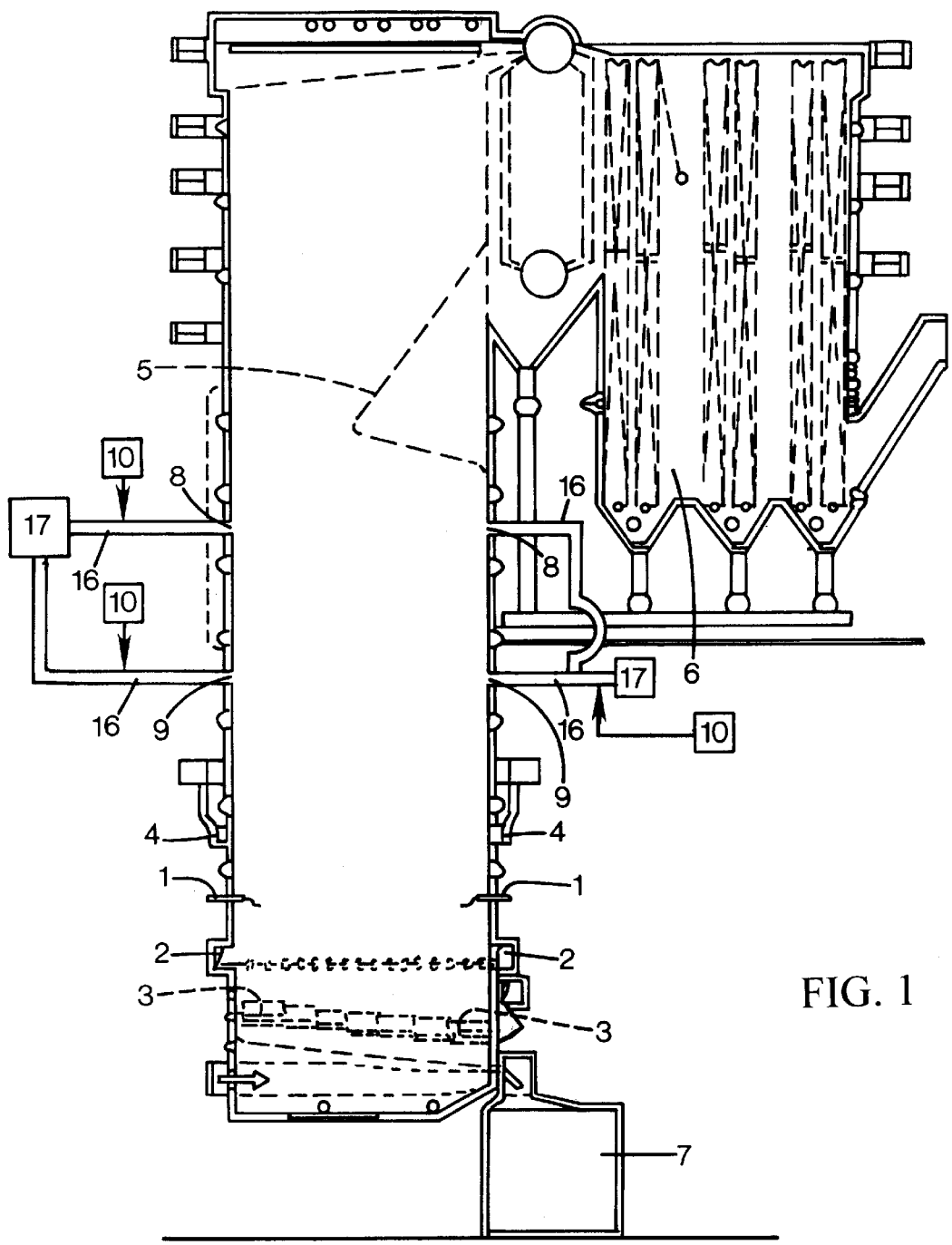
FIG. 1 shows a recovery boiler for making use of the invention.

The recovery boiler as shown in FIG. 1, which is of a conventional type for a steam production of approx. 250 t/h, includes liquor sprayers 1 which are situated in the lower part of the recovery boiler. Openings 2 for blowing in secondary air are located below these liquor sprayers 1. Start burners, which are fed with oil or gas, are also present at this level. Openings 3 for supplying primary air are present below the level for supplying the secondary air. Openings 4 for blowing in tertiary air are located above the liquor sprayers 1. Additional air supply openings 8 are present, on both sides of the furnace space, at a high level in the boiler directly below the region where a tapering of the boiler, the so-called "nose" 5, is located. While there can be several of these openings, expediently eight on both sides, the actual number is not critical. In accordance with SE 468 171, a part of the tertiary air, which would normally be supplied lower down at position 4 in the boiler, is supplied through these air openings. The quantity which is normally introduced at position 4 is thus decreased, and this quantity is allowed to flow in at the most highly situated air supply devices 8. Expediently, the quantity of air which is supplied at this upper position amounts to a quantity corresponding to 5–15% of the total air intake. In accordance with the invention, ammonia gas is supplied to this quantity of air before the latter is introduced at position 8. This means that a gas atmosphere, which is entirely or partially reducing depending on the content of ammonia, carbon monoxide and smaller quantities of hydrogen and hydrogen sulphide, is present in the region from position 4 to position 8. Otherwise, the boiler includes conventional devices, such as a heat exchanger 6 and, under the boiler, a collecting vessel 7, termed dissolver tank, for smelt, which consists of recovered chemicals in the form of known sodium salts.

Figure 2:
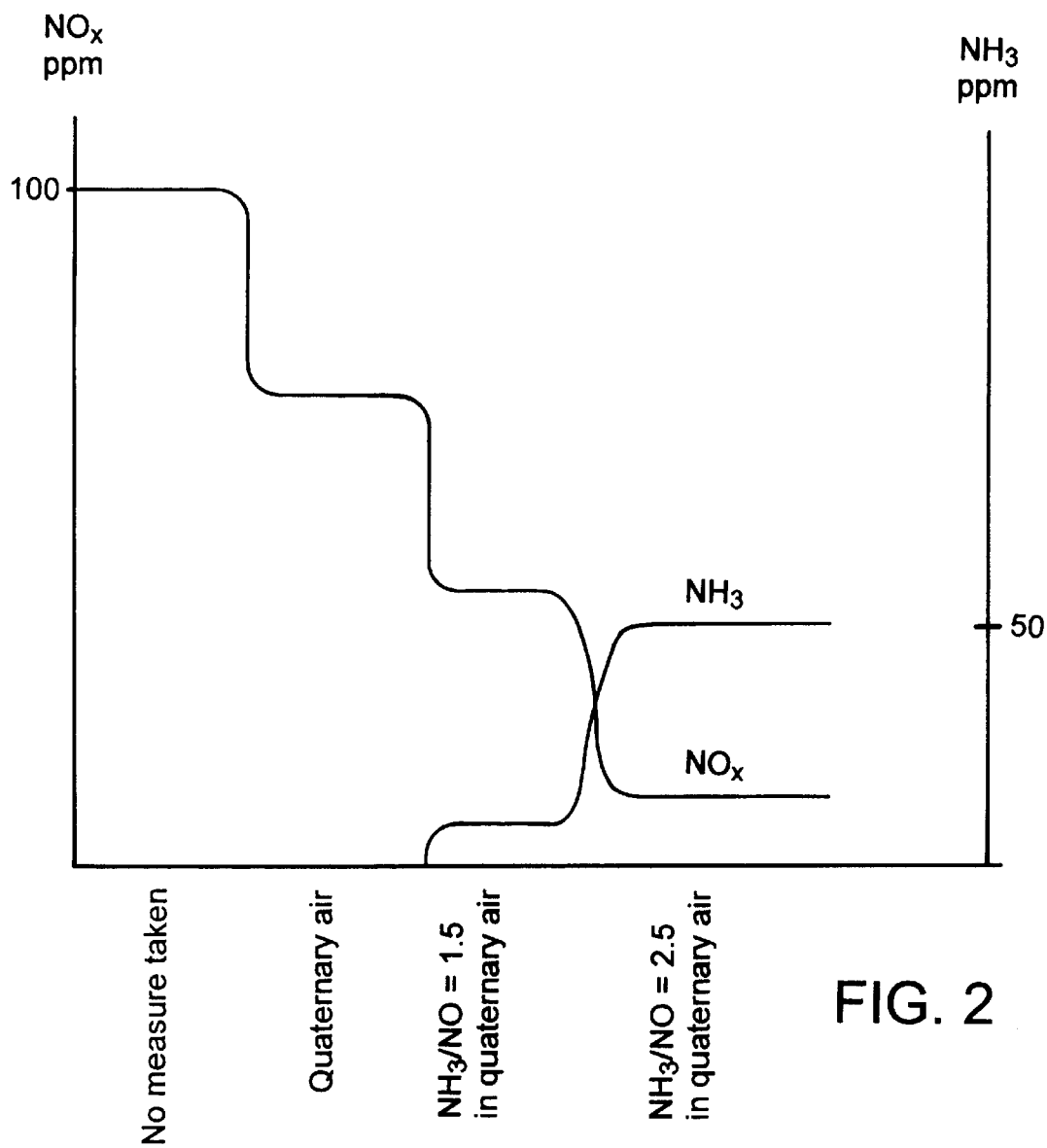
FIG. 2 shows a comparative diagram of the nitrogen oxide content in the flue gases when supplying air/ammonia.

At position 8, and immediately thereafter, the reducing gases are combusted to nitrogen, carbon dioxide, water, etc. and release the last quantity of energy which is possible. This combustion takes place at a temperature of the order of 900–1100° C., at which temperature only very small quantities of nitrogen oxides are formed. These measures result in the quantity of nitrogen oxides being markedly decreased. This is shown in the attached diagram (FIG. 2). The diagram makes clear, on the one hand, the improved result which is achieved with the invention as compared with only adding quaternary air (i.e. without ammonia in accordance with SE 468 171) and, on the other hand, that the effect achieved improves as the amount of ammonia added becomes more overstoichiometric. As has previously been mentioned, any departing excess of ammonia can advantageously be washed away in a flue gas wash.

FIG. 1 also shows a further row of air intakes for overfire air at position 9. While these air intakes can be dispensed with, they can also complement the air intakes at position 8. The number of air intakes at position 9 can be the same as at position 8, expediently eight intakes on both sides of the furnace.

Figure 3:
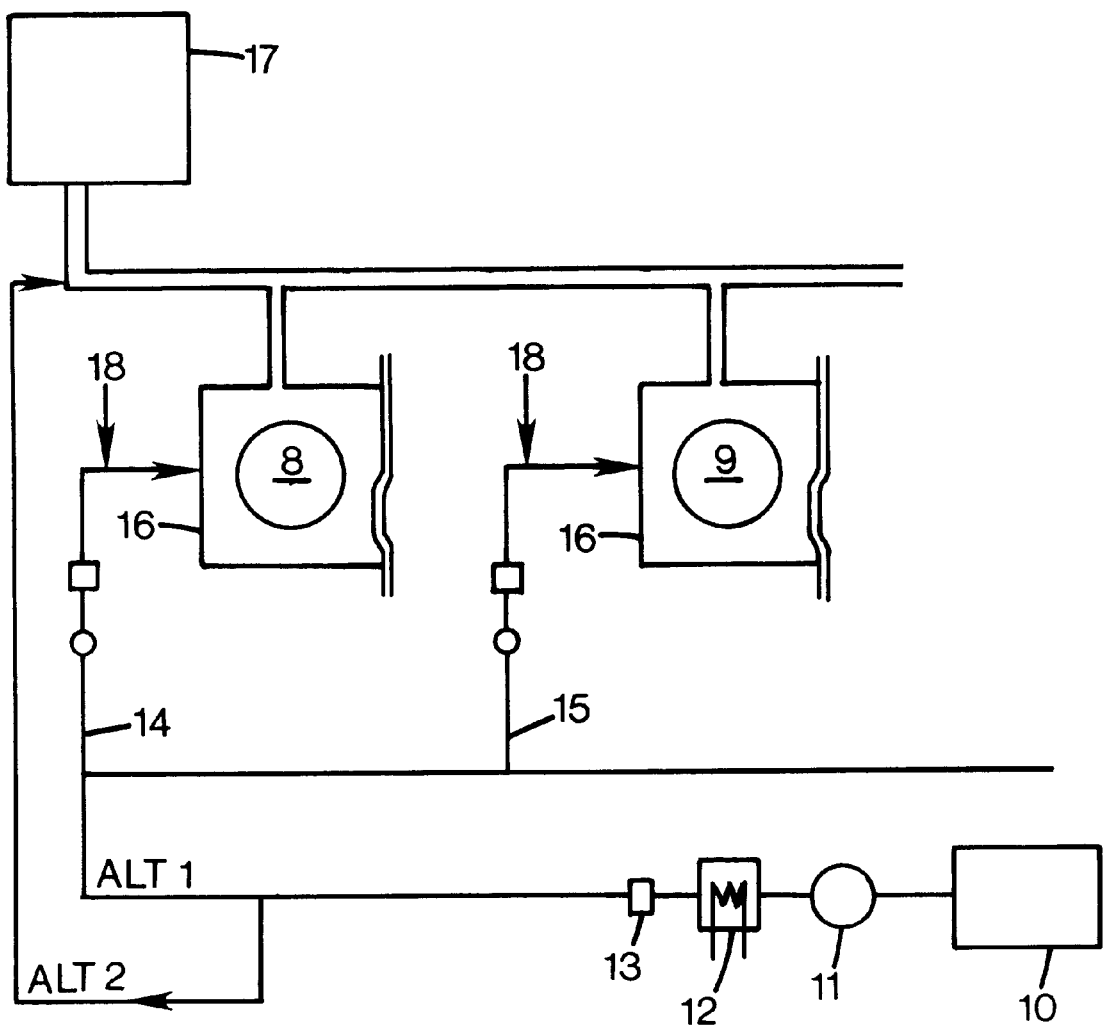
FIG. 3 shows two alternative embodiments for adding ammonia to the air.

FIG. 3 shows two alternative methods of adding the ammonia to the air. Part no. 10 symbolizes the ammonia source. Metering is effected using a device 11, after which the ammonia is volatilized, 12, and the flow is measured, 13. According to alternative 1, the ammonia is supplied to each air box 16 (for the supply openings 8, 9) through separate compressed air-driven, 18, feed lines 14, 15. Each such feed line can be regulated separately. According to alternative 2, the ammonia is instead supplied to the air immediately downstream of the air fan 17, before the air line divides for supply to the different air boxes 16.

As has been said above, the essential point with regard to the invention is that ammonia is added to the last part of the air which is supplied at a high level in the recovery boiler. In addition, the quantity of air at lower levels is decreased to such a degree that an environment which is reducing, or almost reducing, is obtained for a very long time, approximately 2.5–5 seconds, in the normal recovery boiler. This time is to be compared with that which is obtained, namely approximately 0.6 seconds, when the last part of the air is added at the tertiary position 4, approximately 3 metres above the liquor sprayers. Besides resulting in a more reducing atmosphere below the level of the uppermost air addition, decreasing the addition of tertiary air at the same time as making an addition of quaternary air also results, as compared with conventional operating conditions, in a lower temperature below this level and a temperature above the level which is higher relatively. The distribution of air between the tertiary level and the quaternary level can thus be used as a method for guiding the temperature above the site of quaternary air addition to a level which is optimal for reducing nitrogen oxides. This temperature depends, to a high degree, on the content of reducing substances, such as hydrogen, in the flue gases. For example, Lyon ("Thermal DeNO$_x$", Env. Sci. Tech. Vol. 21, No. 3, 1987) has demonstrated that the optimum temperature decreases from 950° C. to 700° C. when the $H_2/NH_3$ ratio increases from 0 to 1.3.

Consequently, by means of arranging the overfire air intake so high up the boiler and at that point admitting a part of the air which would otherwise have been admitted at the tertiary air intake, and in this way obtaining a lower content of nitrogen oxides, the opportunity has been obtained to regulate the content of nitrogen oxides in the exhaust gases by means of adding ammonia to the overfire air and varying the air streams. According to the invention, this can be done automatically by measuring the content of nitrogen oxide and ammonia in the flue gases and allowing these measured values, for example via a computer, to control both valves for blowing the quantities of air into the primary, secondary, tertiary and high tertiary or quaternary air intakes and also the quantity of ammonia gas which is added to the high tertiary or quaternary air intakes. In this way, it is possible to compensate for variations in the quality of the fuel, etc. and consistently obtain a minimal quantity of nitrogen oxides in the flue gases without jeopardizing other operational parameters or occasioning an unacceptably high content of ammonia in the flue gas.

The invention has been described in conjunction with a modern recovery boiler for a steam production of approximately 250 t/h and having a normal height of approximately 50 metres, with the uppermost air intake, for ammonia-containing air, expediently being placed at approximately 16 metres above the liquor sprayers. The same ratio between height and distance above the liquor sprayers can also be used in the case of larger boilers. However, in the case of shorter boilers, another ratio may be expedient since, in the case of such boilers, the dwell time may in any case be too short for satisfactory reduction of the nitrogen oxides.

The invention is not limited to the exemplary embodiment shown and can be varied in different ways within the scope of the patent claims. Other reducing agents, for example urea, can naturally be used in addition to, or instead of, ammonia.

What is claimed is:

1. A recovery boiler for combusting black liquor, comprising:

a primary air supply unit in operative engagement with the recovery boiler;

a secondary air supply unit in operative engagement with the recovery boiler, the secondary air supply unit disposed above the primary air supply unit;

a black liquor sprayer in operative engagement with the recovery boiler, the black liquor sprayer disposed above the secondary air supply unit;

a first tertiary air supply unit in operative engagement with the recovery boiler, the first tertiary air supply unit disposed above the black liquor sprayer;

a second tertiary air supply unit in operative engagement with the recovery boiler, the second tertiary air supply unit disposed above the first tertiary air supply unit;

a quaternary air supply unit in operative engagement with the recovery boiler, the quaternary air supply unit disposed above the second tertiary air supply unit, the quaternary air supply unit and the second tertiary air supply unit disposed above the black liquor sprayer;

an air fan in operative engagement with the recovery boiler; and an ammonia supply unit upstream of the air fan and in fluid communication with the second tertiary air supply unit and the quaternary air supply unit for supplying ammonia thereto.

2. The recovery boiler according to claim 1 wherein the ammonia supply unit further comprises separate compressed feed lines that are coupled to the second tertiary air supply unit and the quaternary air supply unit for supplying air thereto.

3. The recovery boiler according to claim 1 wherein the ammonia supply unit further comprises a first row of supply openings that are disposed about 10 meters above the black liquor sprayer and a second row of supply openings that are disposed about 16 meters above the black liquor sprayer.

4. The recovery boiler according to claim 3 wherein the recovery boiler further comprises an internal nose section that is disposed between about 1 meter and 4 meters above the second row of supply openings.

* * * * *